May 13, 1941.   F. P. LAWLER   2,242,193
POWER TRANSMISSION AND BRAKE CONTROL FOR HOISTS
Filed March 24, 1939   6 Sheets-Sheet 5

FRANK P. LAWLER,
INVENTOR.
BY
ATTORNEY.

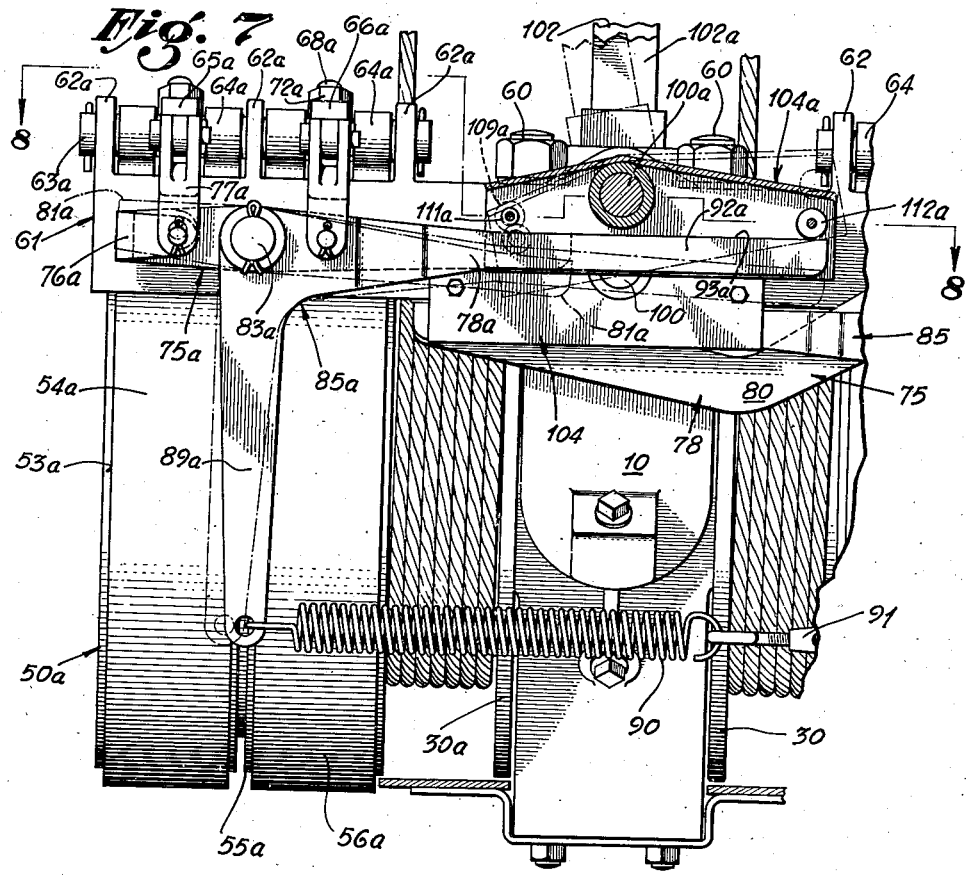
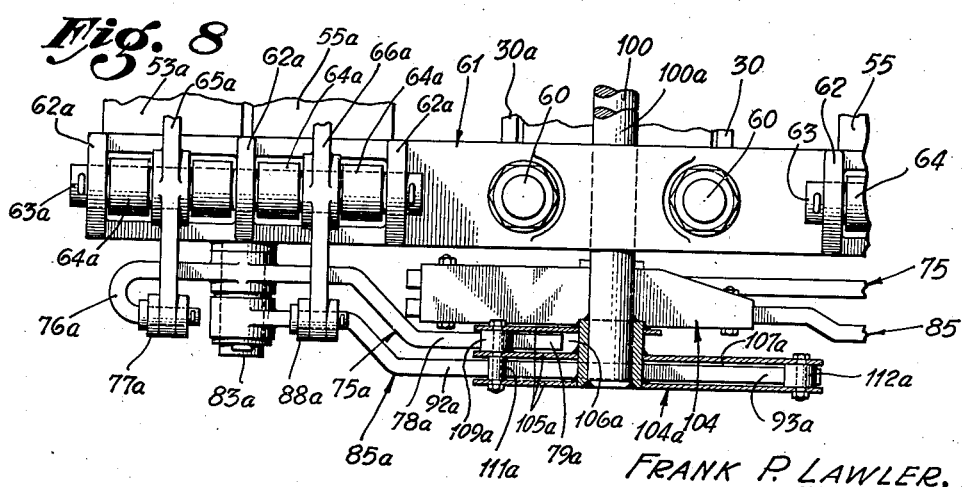

Patented May 13, 1941

2,242,193

UNITED STATES PATENT OFFICE 2,242,193

POWER TRANSMISSION AND BRAKE CONTROL FOR HOISTS

Frank P. Lawler, Huntington Park, Calif.

Application March 24, 1939, Serial No. 263,916

10 Claims. (Cl. 192—4)

My invention relates to hoists and relates particularly to one designed for use on a tractor where it is common to have cable controlled apparatus operating in connection with the tractor and the operation thereof controlled by the tractor operator. The present application is a continuation-in-part of my copending application for Hoist, Serial No. 157,317, filed August 4, 1937, Patent No. 2,199,668, May 7, 1940.

It is an object of my invention to provide a hoist in which the spool or cable drum may be driven in order to wind cable thereon or may be released so that it will be free to rotate in a direction that the cable on the spool may be unwound therefrom. In the preferred form of my invention I provide an operating lever which is movable in one direction to cause the spool to be driven and in another direction to release the spool.

It is another object of my invention to provide a hoist of the character pointed out in the preceding paragraph which has an operating means including cam and lever means whereby the operation of the spool is controlled.

It is a still further object of my invention to provide a hoist having a spool on which a cable may be wound, a brake means whereby the spool may be restrained from rotation, and drive means whereby the spool may be rotated; and in combination with these parts I provide an operating means so constructed and designed that when it is moved in one direction it will first cause the drive means to apply a driving force to the spool and thereafter will release the brake means, and when moved in another direction will release the brake means so that the spool is free to rotate or "free-spool." In this preferred form of my invention the drive means starts to drive the spool before the brake is released, with the result that there will be no back lash, lost motion, or reverse motion in the parts. This is an important feature of my invention, since it relieves to a great extent the wear and tear ordinarily imposed on the operating parts when back lash or lost motion is present.

It is a further object of my invention to provide a hoist having a pair of spools which may be independently driven or made free to rotate, and in which control means is provided whereby the restraining, driving, or freeing of the spools may be accomplished.

In the form of my invention illustrated herein I provide operating means including operating levers which are movable in the same direction to drive either of the spools and which are movable in a different direction to release the spools so that they will be free to rotate.

In the accompanying drawings I have illustrated a preferred form of my invention which constitutes an improvement on the hoist disclosed in my copending application noted above. Various alterations and modifications may be made in my invention without departing from the spirit and scope thereof. Likewise, a single spool and accompanying mechanism may be employed or two spools and accompanying mechanism, as illustrated herein, may be employed. In fact, it will be readily seen that three, four, or more, drums can be made in this type of hoist by simply extending the hoist shaft and arranging the drums side-by-side. I believe my invention to be new not only in its entirety but in the several novel subcombinations and parts disclosed and described in this specification. I therefore wish my invention to be broadly construed in accordance with the statement of invention and the appended claims.

Referring to the drawings in detail:

Fig. 7 is a fragmentary elevational view partly in section on the line 7—7 of Fig. 2 and showing the operating means for the left-hand spool or cable drum.

Fig. 8 is a fragmentary view partly in section taken on the line 8—8 of Fig. 7.

Figure 2:
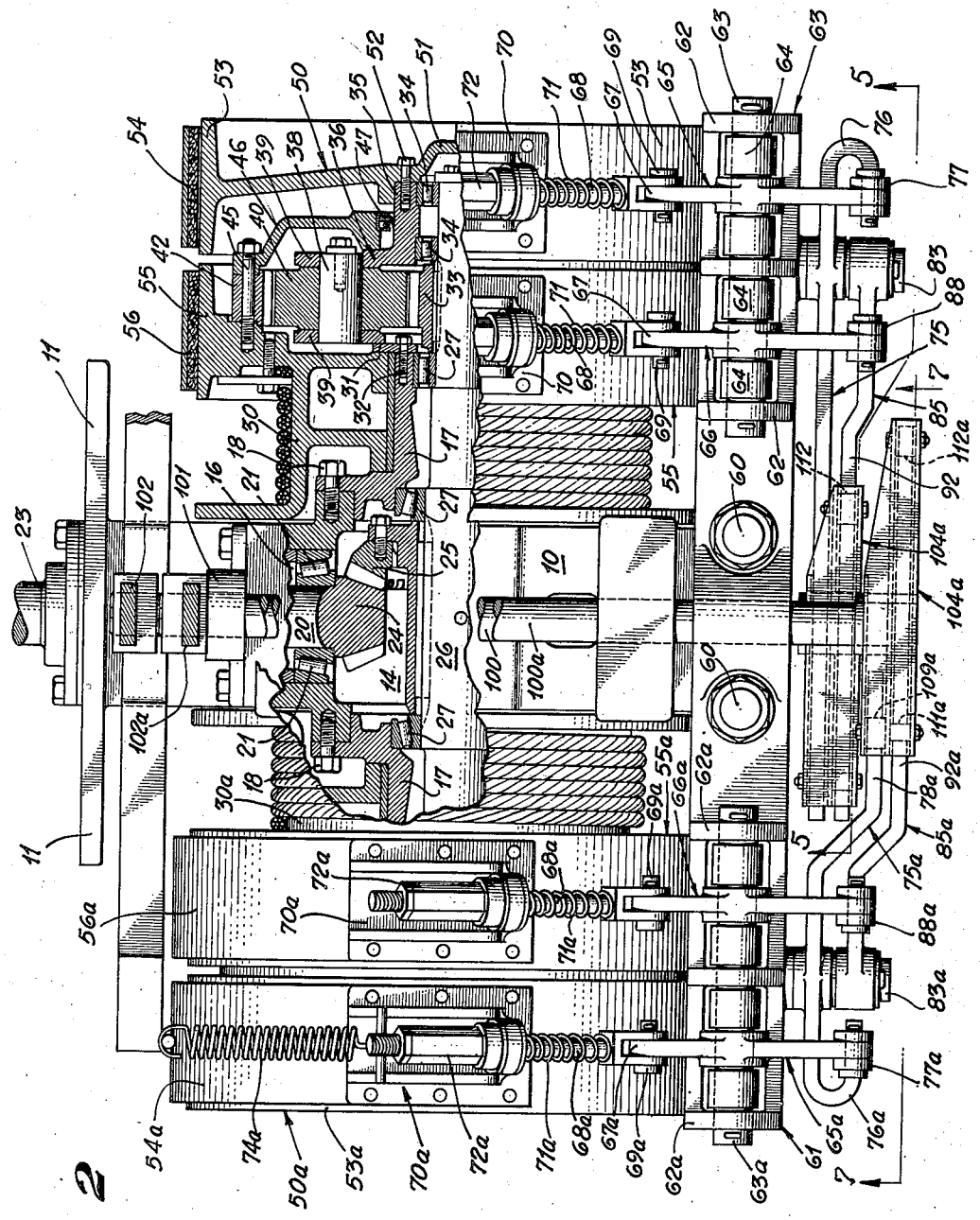
Fig. 2 is a plan view of Fig. 1 partly in section to show a portion of the interior thereof.
Figure 4:
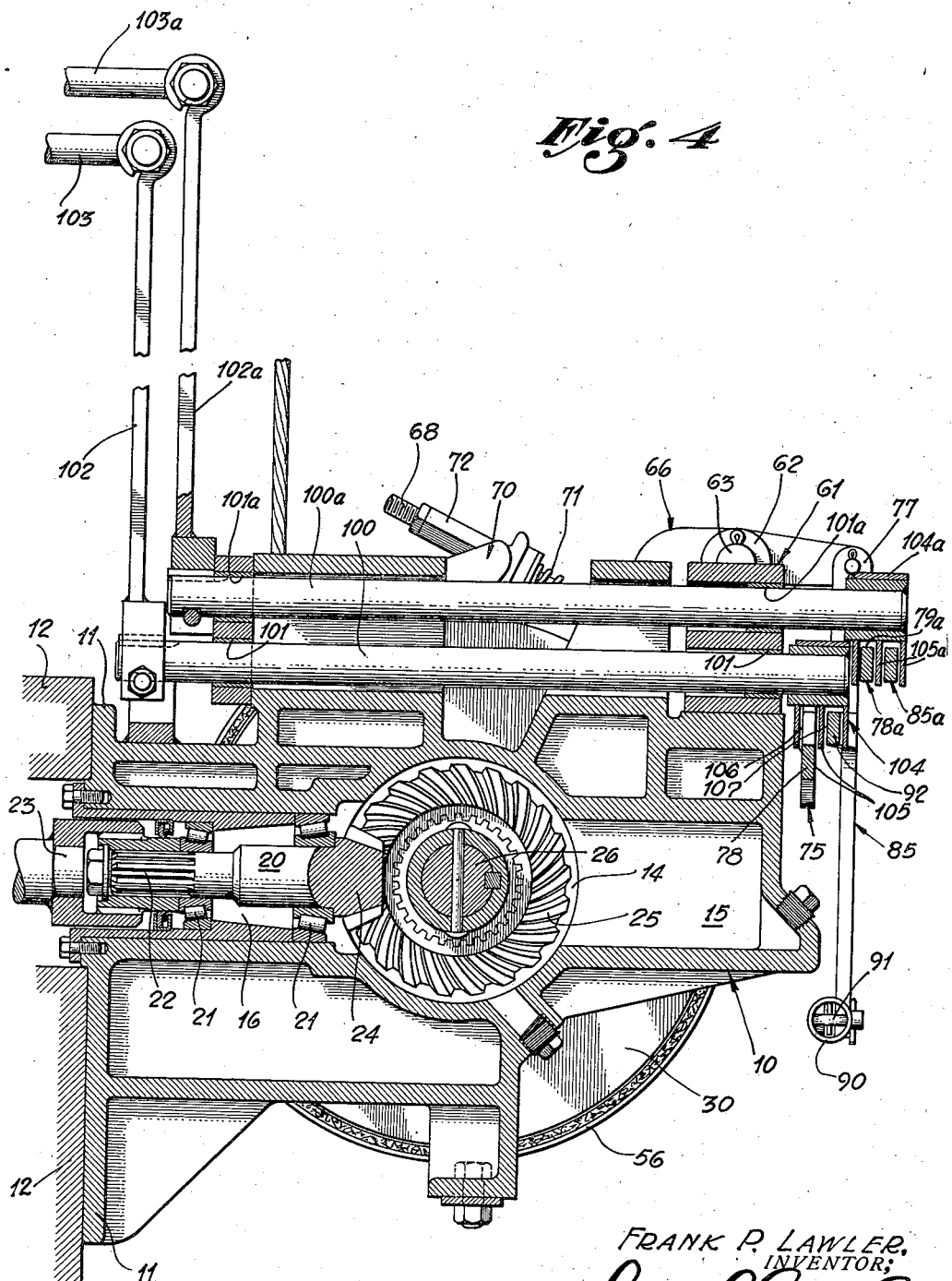
Fig. 4 is a section taken on the line 4—4 of Fig. 1.

Referring to the drawings in detail and particularly Figs. 2 and 4, my invention provides a supporting structure which includes a central housing 10 having a flange 11 whereby the hoist may be secured to the supporting structure, such, for example, as the rear transmission case 12 of a tractor, as diagrammatically illustrated in Fig. 4. The housing 10 provides a central gear chamber 14 and an oil chamber 15 in communication therewith. The housing also provides a pinion shaft chamber 16. The supporting structure also includes a pair of extensions of spool-journals 17 which are in transverse axial alignment and are secured to side walls of the central housing 10 by suitable bolts 18. There are two extensions 17 which are identical in construction, one being right-hand, as shown in Fig. 2, and the other being left-hand with reference to the central gear chamber 14.

Positioned in the pinion shaft chamber is a pinion shaft 20 supported in bearings 21 and having an end splined, as indicated at 22, in order that it may be drivably connected to a power take-off 23 of the tractor or other device to which the hoist is connected. On the inner end of the pinion shaft 20 is a bevel pinion 24 which is in mesh with a bevel gear 25 which is secured to a main shaft 26. The main shaft 26 extends axially through the extensions 17 and at right angles to the axis of the pinion shaft 20 and is supported in the extensions 17 by bearings 27.

In the form of my invention disclosed herein the left-hand and right-hand spools or cable drums, left-hand and right-hand brake means, left-hand and right-hand drive means, and left-hand and right-hand operating means are provided. Since the construction is identical except for certain minor details in certain isolated instances, I will describe the right-hand construction and will identify in the drawings the corresponding part in the left-hand construction utilizing the identical numeral followed by the suffix *a*. Where there are differences in construction, these differences will be referred to in the course of the description.

Rotatably mounted on the right-hand extension 17 is a spool or cable drum 30 which is held in place by a retainer washer 31 secured by bolts 32 to the end of the extension. My invention provides a spool drive means or clutch means which has a sun gear 33 keyed to the portion of the main shaft 26 which extends outwardly from the extension 17. Rotatably mounted by bearings 34 on the extreme outer end of the main shaft 26, which bearings are positioned within a hub 35, is a planetary gear carrier 36, of which the hub 35 is a part. The planetary gear carrier 36 has a plurality of shafts 38 supported by flanges 39 of the planetary gear carrier which rotatably support planetary gears 40. The planetary gears 40 at their inner parts engage the sun gear 33 and at their outer parts engage a ring gear 42 which is secured to the outer part of the spool 30 by bolts 45 which also secure in place a cover 46. The cover 46 extends inwardly around the flanges 39 and carries an oil seal 47 which forms a seal between the cover 46 and the hub 35. Secured to the outer end of the hub 35 is a clutch drum 50 having a web 51 through which the securing bolts 52 are extended, this web 51 forming a closure around the end of the main shaft 26. The outer part of the web 51 carries a cylindrical drum portion 53 which is surrounded by a clutch band 54. The outer part of the spool 30 includes a brake drum 55 which is surrounded by a brake band 56.

Secured to the central housing 11 by bolts 60 is an anchor beam 61. The anchor beam 61 has lugs 62 which carry a rocker shaft 63. Dead ends 64 of the clutch and brake bands 54 and 56 are secured to the rocker shaft 63, as shown. Pivotally supported on the rocker shaft 63 is a clutch band rocker 65 and a brake band rocker 66, each being of identical construction and having depending arms 67 to which rods 68 are pivotally connected as at 69. The rods 68 extend through fixtures 70 mounted on the live ends of the bands 54 and 56, and carry compression springs 71, and also adjusting nuts 72 whereby the bands may be properly adjusted. The clutch band 54 is provided with a tension spring 74 which acts to hold the clutch band in disengaged position.

For operating the clutch band my invention provides a clutch lever or drive means lever 75 which is pivotally mounted on a stub shaft 83 having an arm 76 connected by a link 77 to the rearwardly extending arm of the rocker 65. The clutch lever 75 has an operating arm 78 which extends across the central plane of the hoist and is provided at the outer end with an engageable wall 79. The operating arm 78a of the clutch lever 75a is relatively short and is offset, as shown in Fig. 7, so that the outer end rests in an overlapping position with relation to the operating arm 78. This particular shape is given to the arm 78 to provide the necessary clearance for the operating means which will be described later. It will also be noted that the operating arm 78 is in a lower plane than the operating arm 78a and that the arm 78 is curved downwardly at 80 to provide clearance, as will be described later.

Figure 5:
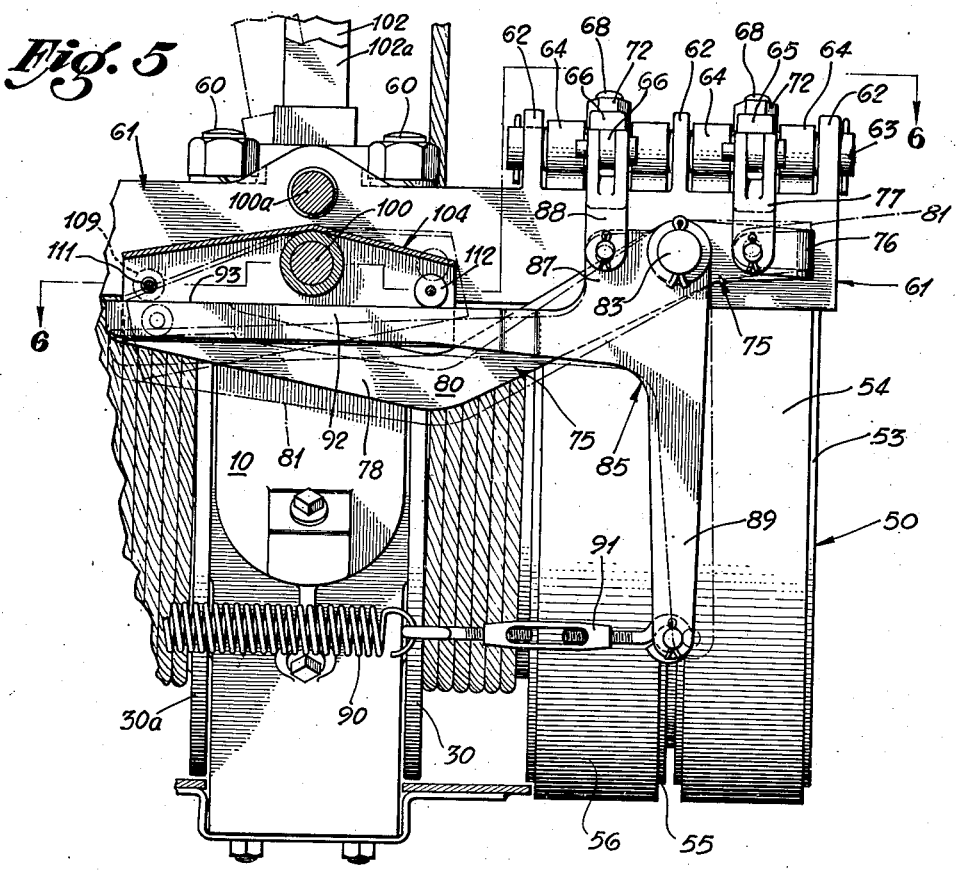
Fig. 5 is a fragmentary view partly in section on the line 5—5 of Fig. 2 and showing the operating means for the right-hand spool or cable drum.
Figure 6:
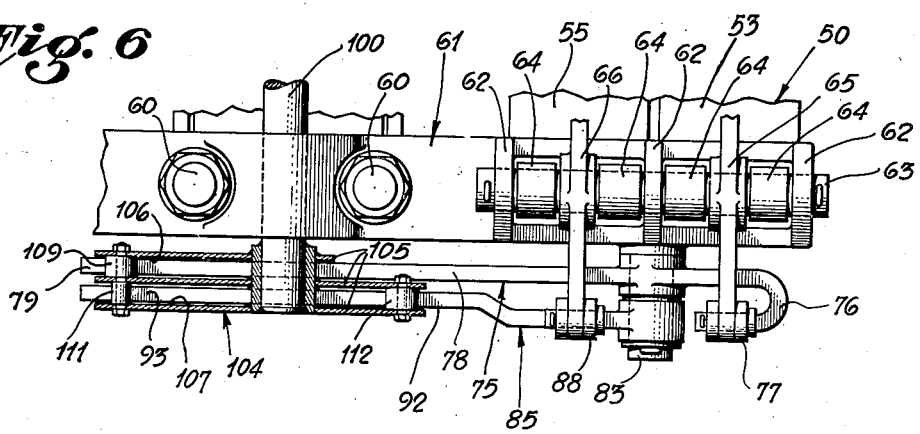
Fig. 6 is a fragmentary partly sectioned view taken on the line 6—6 of Fig. 5.

When the operating arm is moved from full line position, as shown in Fig. 5, into broken line position 81 shown in this same figure, the rocker 65 is moved in a counterclockwise direction, as shown in Fig. 4, and the clutch band is applied to the clutch drum. This in turn locks the planetary gear carrier 36 from rotation and causes the main shaft 26 to drive the spool 30 through the medium of the sun gear 33, the planetary gears 40, and the ring gear 42.

My invention also provides a brake lever 85 positioned adjacent the clutch lever 75, being pivotally mounted on the stub shaft 83. The lever 85 has an ear 87 which is pivotally connected by a link 88 to the rearwardly extending arm 67 of the rocker 66. The brake lever 85 has a depending arm 89 and the depending arms 89 and 89a of the right-hand and left-hand brake levers 85 and 85a are connected together by a tension spring 90 and a turnbuckle 91 whereby the force exerted by the spring 90 tending to swing the outer ends of the arms 89 and 89a toward each other may be adjusted. The brake lever 85 has an operating arm 92 provided with an engageable wall 93. The operating arm 92 is positioned adjacent the operating arm 78 and the engageable wall 93 is preferably in the same plane as the engageable wall 79. The operating arm 92a is offset outwardly for clearance reasons and rests adjacent the operating arm 78a. The engageable wall 93a is in the same plane as the engageable wall 79a of the operating arm 78a.

Figure 3:
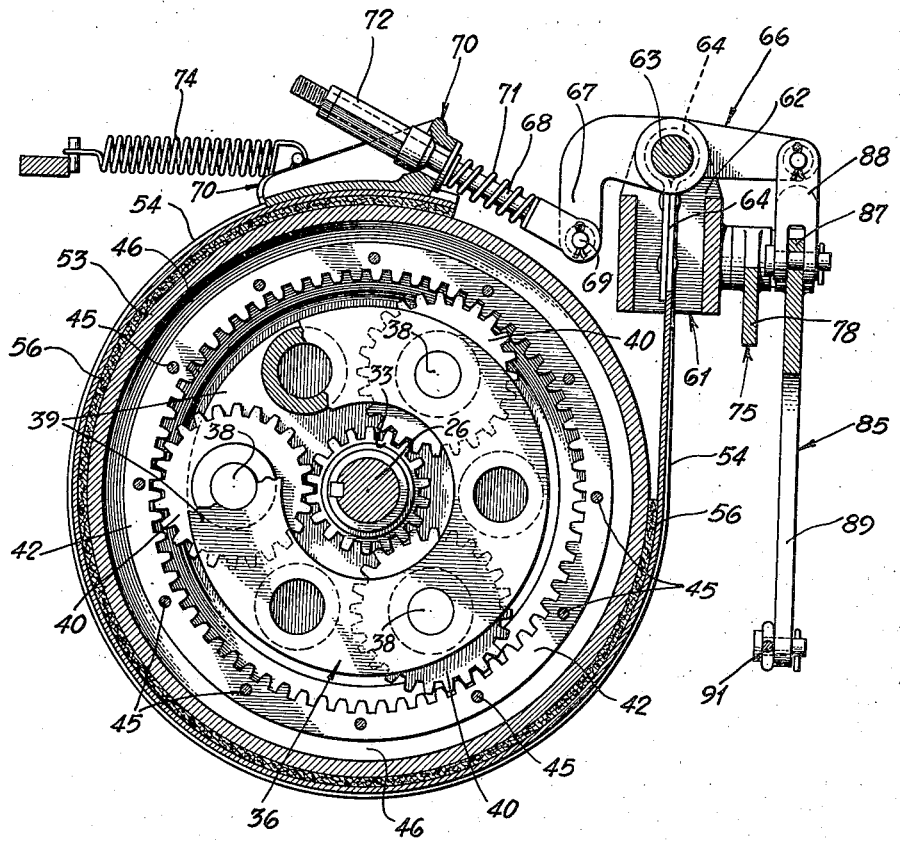
Fig. 3 is a section taken on the line 3—3 of Fig. 1.

When the operating arm 92 is moved downwardly the rocker 66 is moved in a clockwise direction, when looking at the structure in the direction in which Fig. 3 is taken, which releases the brake band 56 and makes the spool 30 free to rotate.

Figure 1:
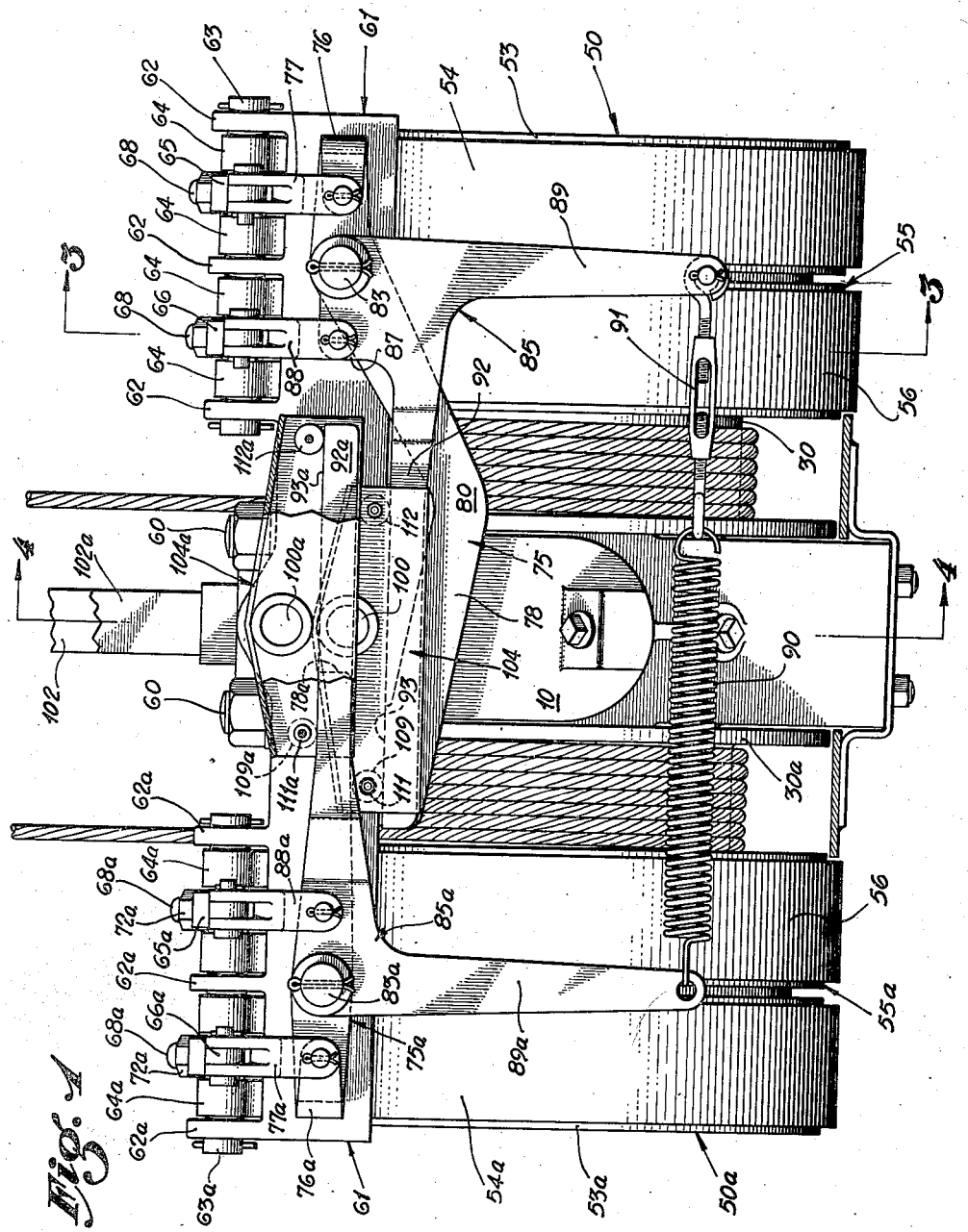
Fig. 1 is an elevational view of a hoist incorporating the features of my invention, this view being taken from the rear of the hoist and showing the means for operating the brake means and drive means of the invention.

For operating the right-hand clutch lever and brake lever my invention provides a right-hand operating means which has an operating shaft 100 supported by bearings 101 which are mounted on the central housing 10. The shaft 100 extends in a longitudinal plane from the back to the front of the hoist and has an operating lever 102 secured to the front end thereof, which operating lever extends upwardly and has a suitable handle 103 whereby the operating shaft 100 may be rotated in a clockwise or counterclockwise direction. It will be noted that the shaft 100a of the left-hand operating means is supported in a plane above the operating shaft 100 and that the operating lever 102a is positioned adjacent but rearwardly of the operating lever 102. Secured to the rearward end of the shaft 100 is a housing 104 having depending walls 105 which provide a transverse clutch lever channel 106 and an adjacent transverse brake lever channel 107 into which the operating arms 78 and 92 respectively extend. As will be seen from Fig. 1, the housing 104a is in a position above and rearwardly of the housing 104 and in such a position that the channels 106a and 107a receive the operating arms 78a and 92a.

Placed in the clutch lever channel 106 in a position to the left of the shaft 100, as illustrated in the various views, and in a position near the end of the operating arm 78 is a clutch cam 109 which constitutes a means whereby the clutch lever 78 may be engaged and swung downwardly in order that the clutch band 54 may be engaged. Positioned in the brake lever channel 107 is a cam structure in the form of a cam means 111 which is adjacent the cam means 109 and the cam means 112 which is positioned in the channel 107 on the right side of the shaft 100. The cam means 109, 111, and 112 are conveniently made in the form of rollers, but may be in other forms if desired. The cam means 109 and 112 are made from the same size rollers so that the lower portions thereof which engage the operating arms 78 and 92 are in the same horizontal plane when the parts are in neutral position, as shown in full lines in various views in the drawings. The arranging of these two means as stated is not indispensable but is desirable in order that there will be no lost motion or play in the apparatus. The cam means 111 is made of a roller of smaller diameter, with the result that the lower portion thereof adapted to engage the engageable wall 93 of the operating lever 102 is in a higher plane than the lower portion of the cam means 109, with the result that when the housing is moved in an anti-clockwise direction the clutch lever 75 will be moved downwardly a distance equal to one-half the differences in diameters of the rollers from which the cam means 109 and 111 are formed before the brake lever is operated. In other words, the operating means for the levers 75 and 85 are so formed that the clutch lever will be moved downwardly and the clutch band 54 will be engaged before the brake lever is moved downwardly and the brake band released. This design of cam means constitutes but one of a number of different structures which may be employed for operating the clutch and brake levers so that the clutch will be applied before the brake is released.

By virtue of this arrangement there will be no back lash in the spool 30 which would occur if the brake band were released before the clutch band were engaged and when the brake band is released the spool will immediately rotate in a direction to wind cable thereon.

The cam means 112 engages the brake lever 92 when the housing 104 is rotated in a clockwise direction. This operation is performed when the operator desires to release the brake band in order to allow the spool 30 to rotate in a direction that the cable thereon may unwind.

The left-hand housing 104a and the left-hand cam means 109a, 111a, and 112a are designed to operate in the same direction as the corresponding parts of the right-hand operating means in order that identical operations will be performed either in the right-hand or left-hand mechanism upon identical movement of the left-hand and right-hand operating levers 102 and 102a. By so designing the hoist the operator will know that when either of the operating levers is moved in a counterclockwise direction the spool will be rotated, and when an operating lever is moved in a clockwise direction the spool will be free to rotate.

As stated heretofore, the preferred form of my invention includes left-hand and right-hand spools and various operating means therefor. In the foregoing I have described only the right-hand mechanism, but it should be understood that the left-hand mechanism has corresponding parts. The right-hand and left-hand mechanisms operate in an identical manner, and therefore in describing the operation of my invention I will describe the operation of the right-hand mechanism which, it will be understood, applies with equal force to the left-hand mechanism.

When the operating means, which includes the shaft 100, the operating lever 102, and parts rigidly secured thereto, is in a neutral position the brake means restrains the spool 30 from rotation and the clutch means is in a non-operating position. The operating means is held in this neutral position by engagement of the engageable walls 79 and 93 with the cam means 109 and 112 respectively. The springs 74 and 90 hold the operating means upwardly so that the engageable surfaces may pressurally engage the cam means.

When the operator desires to rotate the spool 30 in a direction to wind cable thereon, he grasps the handle 103 and moves the operating lever 102 in a counterclockwise direction when looking at the apparatus from the rear. This causes the cam means 109 and 111 to move downwardly and causes an operation of the clutch lever and brake lever, as previously described. When this movement has taken place the spool is rotated to wind cable thereon. By allowing the operating means to return to neutral position the spool 30 then becomes locked from rotation. When the operator desires to unwind cable from the spool 30 he grasps the handle 103 and moves the operating lever in a clockwise direction. This moves the cam means 112 downwardly and causes the brake lever to operate as previously stated, thus releasing the brake band and allowing the spool 30 to free-spool. During the free-spooling of the spool 30, the ring gear 42 rotates with the spool 30 in the same direction as the gear 33, and the speed of rotation of the planetary gear carrier 36 will increase to a speed of rotation closer to the velocity of the shaft 26. When the speed of rotation of the ring gear 42 is the same as the speed of the gear 33, rotation of the planetary gears 40 on their shafts 38 will cease, and the members 36 and 50 will revolve with the shaft 26. By moving the operating lever 102a in the same direction as the lever 102 the same operations of the left-hand spool 30a are performed.

I claim as my invention:

1. In a hoist of the character described, the combination of: a spool supported for rotation; a brake for said spool normally applied to hold said spool from rotation, said brake having an individual control lever; a drive member having a power connection whereby it may be continuously rotated; clutch means for causing said drive member to drive said spool, said clutch means being normally in inactive condition and having an individual control lever; and control means for said brake and said clutch means, said control means comprising a control member movable in two directions, said control member having means effective when said control member is moved in one of its directions of movement, to sequentially engage said clutch means lever and said brake lever and to move said levers in such manner as to first actuate said clutch means so that said drive member will apply a driving force to said spool and then actuate said brake so as to release said spool, and said control member having means effective when it is moved in the other of its directions of movement, to move said brake lever so as to release said brake while said clutch means is in said inactive condition, whereby said spool will be free to rotate.

2. In a hoist of the character described, the combination of: a spool supported for rotation; a brake for said spool normally applied to hold said spool from rotation, said brake having an individual control lever; a drive member having a power connection whereby it may be continuously rotated; clutch means for causing said drive member to drive said spool, said clutch means being normally in inactive condition and having an individual control lever; and control means for said brake and said clutch means, said control means comprising a control member normally resting in an intermediate position and being movable in two directions from said intermediate position, said control member having means effective when it is moved in one of its directions from said intermediate position to sequentially move said clutch means lever and said brake lever in such manner as to first actuate said clutch means so that said drive member will apply a driving force to said spool and then actuate said brake so as to release said spool, and said control member having means effective when it is moved in the other of its directions of movement, to move said brake lever so as to release said brake while said clutch means is in said inactive condition, whereby said spool will be free to rotate.

3. In a hoist of the character described, the combination of: a spool supported for rotation; a brake for said spool normally applied to hold said spool from rotation, said brake having an individual control lever; a drive member having a power connection whereby it may be continuously rotated; clutch means for causing said drive member to drive said spool; said clutch means being normally in inactive condition and having an individual control lever; and control means for said brake and said clutch means, said control means having a control member movable in two directions from an intermediate position, said control member having a part effective when said control member is moved in the first of its directions to move said clutch means lever whereby said clutch means will be actuated so that said drive member will apply a rotative force to said spool, said control member having a part effective when it is moved in said first direction, to move said brake lever in such manner that it will release said brake after said clutch means is actuated, and said control member having another part effective when said control member is moved in the second of its directions of movement to move said brake lever so as to release said brake while said clutch means is in said inactive condition, whereby rotation of said spool will not be restrained by said brake.

4. In a hoist of the character described, the combination of: a spool supported for rotation; brake means for said spool to normally restrain the same from rotation; power drive means; clutch means associated with said drive means and said spool normally in inactive condition and being operable to transmit a driving force from said drive means to said spool; and a unitary control means for said brake and said clutch means, said control means comprising a control member having two directions of movement from an intermediate position, said control means having a part effective when said control member is moved in the first of its directions of movement to actuate said clutch means whereby a driving force will be transmitted from said drive member to said spool, and a part also effective in consequence of movement of said control member in said first direction thereof, to release said brake after said clutch means has been so actuated, and said control means having another part effective when said control member is moved in the second of its directions of movement to release said brake while said clutch means remains in inactive condition.

5. In a hoist of the character described, the combination of: a spool supported for rotation; brake means for said spool to normally restrain the same from rotation, said brake means having a lever whereby it may be released; power drive means; clutch means associated with said drive means and said spool normally in inactive condition and being operable to transmit a driving force from said drive means to said spool, said clutch means having a lever whereby it may be actuated; and a unitary control means for said brake and said clutch means, said control means comprising a control member pivoted intermediate its ends and having two directions of movement from an intermediate position, said control member having near one end thereof a part effective when said control member is moved in the first of its directions of movement to transmit movement to said clutch means lever to actuate said clutch means whereby a driving force will be transmitted from said drive member to said spool, and also having near the said end thereof a part effective when said control member is moved in said first direction thereof to transmit movement to said brake lever whereby to release said brake after said clutch means has been so actuated, and said control member having near the other end thereof a part effective when said control member is moved in the second of its directions of movement to transmit movement to said brake lever to release said brake without actuating said clutch means.

6. In a hoist of the character described, the combination of: a drivable member supported for rotation; a brake for said drivable member normally applied to hold said drivable member from rotation, said brake having an individual control lever; a drive member having a power connection whereby it may be continuously rotated; clutch means for causing said drive member to drive said drivable member, said clutch means being normally in inactive condition and having an individual control lever; and control means for said brake and said clutch means, said control means comprising a control member movable in two directions, said control member having means effective when said control member is moved in one of its directions of movement, to sequentially engage said clutch means lever and said brake lever and to move said levers in such manner as to first actuate said clutch means so that said drive member will apply a driving force to said drivable member and then actuate said brake so as to release said drivable member, and said control member having means effective when it is moved in the other of its directions of movement, to move said brake lever so as to release said brake while said clutch means is in said inactive condition, whereby said drivable member will be free to rotate.

7. In a hoist of the character described, the combination of: a drivable member supported for rotation; a brake for said drivable member normally applied to hold said drivable member from rotation, said brake having an individual control lever; a drive member having a power connection whereby it may be continuously rotated; clutch means for causing said drive member to drive said drivable member, said clutch means being normally in inactive condition and having an individual control lever; and control means for said brake and said clutch means, said control means comprising a control member normally resting in an intermediate position and being movable in two directions from said intermediate position, said control member having means effective when it is moved in one of its directions from said intermediate position to sequentially move said clutch means lever and said brake lever in such manner as to first actuate said clutch means so that said drive member will apply a driving force to said drivable member and then actuate said brake so as to release said drivable member, and said control member having means effective when it is moved in the other of its directions of movement, to move said brake lever so as to release said brake while said clutch means is in said inactive condition, whereby said drivable member will be free to rotate.

8. In a hoist of the character described, the combination of: a drivable member supported for rotation; a brake for said drivable member normally applied to hold said drivable member from rotation, said brake having an individual control lever; a drive member having a power connection whereby it may be continuously rotated; clutch means for causing said drive member to drive said drivable member; said clutch means being normally in inactive condition and having an individual control lever; and control means for said brake and said clutch means, said control means having a control member movable in two directions from an intermediate position, said control member having a part effective when said control member is moved in the first of its directions to move said clutch means lever whereby said clutch means will be actuated so that said drive member will apply a rotative force to said drivable member, said control member having a part effective when it is moved in said first direction, to move said brake lever in such manner that it will release said brake after said clutch means is actuated, and said control member having another part effective when said control member is moved in the second of its directions of movement to move said brake lever so as to release said brake while said clutch means is in said inactive condition, whereby rotation of said drivable member will not be restrained by said brake.

9. In a hoist of the character described, the combination of: a drivable member supported for rotation; brake means for said drivable member to normally restrain the same from rotation; power drive means; clutch means associated with said drive means and said drivable member normally in inactive condition and being operable to transmit a driving force from said drive means to said drivable member; and a unitary control means for said brake and said clutch means, said control means comprising a control member having two directions of movement from an intermediate position, said control means having a part effective when said control member is moved in the first of its directions of movement to actuate said clutch means whereby a driving force will be transmitted from said drive member to said drivable member, and a part also effective in consequence of movement of said control member in said first direction thereof, to release said brake after said clutch means has been so actuated, and said control means having another part effective when said control member is moved in the second of its directions of movement to release said brake while said clutch means remains in inactive condition.

10. In a hoist of the character described, the combination of: a drivable member supported for rotation; brake means for said drivable member to normally restrain the same from rotation, said brake means having a lever whereby it may be released; power drive means; clutch means associated with said drive means and said drivable member normally in inactive condition and being operable to transmit a driving force from said drive means to said drivable member, said clutch means having a lever whereby it may be actuated; and a unitary control means for said brake and said clutch means, said control means comprising a rockable control member pivoted intermediate its ends and having two directions of rocking movement from an intermediate position, said control member having near one end thereof a part effective when said control member is rocked in the first of its directions of movement to transmit movement to said clutch means lever to actuate said clutch means whereby a driving force will be transmitted from said drive member to said drivable member, and also having near the said first end thereof a part effective when said control member is rocked in said first direction thereof to transmit movement to said brake lever whereby to release said brake so that said power drive means may drive said drivable member, and said control member having near the other end thereof a part effective when said control member is rocked in the second of its directions of movement to transmit movement to said brake lever to release said brake without actuating said clutch means.

FRANK P. LAWLER.